(12) United States Patent
Li et al.

(10) Patent No.: US 11,200,351 B2
(45) Date of Patent: Dec. 14, 2021

(54) METHOD FOR CONSTRUCTING CURVE OF ROBOT PROCESSING PATH OF PART WITH SMALL CURVATURE BASED ON POINT CLOUD BOUNDARY

(71) Applicant: HUAZHONG UNIVERSITY OF SCIENCE AND TECHNOLOGY, Hubei (CN)

(72) Inventors: Wenlong Li, Hubei (CN); Cheng Jiang, Hubei (CN); Gang Wang, Hubei (CN); Zelong Peng, Hubei (CN); Han Ding, Hubei (CN)

(73) Assignee: HUAZHONG UNIVERSITY OF SCIENCE AND TECHNOLOGY, Hubei (CN)

( * ) Notice: Subject to any disclaimer, the term of this patent is extended or adjusted under 35 U.S.C. 154(b) by 0 days.

(21) Appl. No.: 17/059,469

(22) PCT Filed: Jun. 13, 2020

(86) PCT No.: PCT/CN2020/095988
§ 371 (c)(1),
(2) Date: Nov. 30, 2020

(87) PCT Pub. No.: WO2021/000720
PCT Pub. Date: Jan. 7, 2021

(65) Prior Publication Data
US 2021/0173966 A1 Jun. 10, 2021

(30) Foreign Application Priority Data
Jun. 30, 2019 (CN) .......................... 201910581630.5

(51) Int. Cl.
*G06F 30/10* (2020.01)
*G06T 17/30* (2006.01)
(Continued)

(52) U.S. Cl.
CPC ............ *G06F 30/10* (2020.01); *G06K 9/6221* (2013.01); *G06T 17/30* (2013.01); *G09C 1/00* (2013.01); *G06T 2210/56* (2013.01)

(58) Field of Classification Search
CPC .... G06F 30/10; G06K 9/6221; G06K 9/6223; G06T 17/30; G06T 2210/56; G06T 17/00; G09C 1/00
See application file for complete search history.

(56) References Cited

U.S. PATENT DOCUMENTS 8,004,517 B1 * 8/2011 Edelsbrunner .......... G06T 17/20
345/419
2014/0192050 A1 7/2014 Qiu et al.

FOREIGN PATENT DOCUMENTS

CN 104820744 8/2015
CN 108363357 8/2018
(Continued)

OTHER PUBLICATIONS

Weber et al. "Sharp feature preserving MLS surface reconstruction based on local feature line approximations" Graphical Models, vol. 74, pp. 335-345 [retrieved on Jul. 12, 2021] (Year: 2012).*
(Continued)

*Primary Examiner* — Rehana Perveen
*Assistant Examiner* — Alfred H B Wechselberger
(74) *Attorney, Agent, or Firm* — JCIP Global Inc.

(57) ABSTRACT

The disclosure discloses a method for constructing actual processing curve of part with small curvature based on a point cloud boundary. The method includes: (a) encrypting a three-dimensional ordered boundary curve of a part to be processed; (b) fitting encrypted boundary points into a plane, and projecting each boundary point into the plane to obtain a projection point; (c) performing Euclidean cluster within the plane to obtain point sets, and fitting the obtained point sets into a straight line; (d) performing the Euclidean cluster (Continued)

on projection points that are not fitted into the straight line to obtain corner point sets, and fitting a sharp corner or a rounded corner of the corner point sets to obtain a fitted boundary curve within the plane; (e) mapping the fitted boundary curve to a curved surface of the three-dimensional ordered boundary curve to obtain an actual processing curve of the part to be processed.

16 Claims, 4 Drawing Sheets

(51) Int. Cl.
*G06K 9/62* (2006.01)
*G09C 1/00* (2006.01)

(56) References Cited

FOREIGN PATENT DOCUMENTS

| CN | 105957076 | * | 9/2018 | ................ G06T 7/10 |
| CN | 108510516 | * | 9/2018 | ............. G06T 7/187 |
| CN | 109740227 | * | 5/2019 | ............. G06F 17/50 |
| CN | 110349252 | | 10/2019 | |

OTHER PUBLICATIONS

Mineo et al. "Novel algorithms for 3D surface point cloud boundary detection and edge reconstruction" Journal of Computational Design and Engineering, vol. 6, pp. 81-91 [retrieved on Jul. 12, 2021] (Year: 2018).*

Zhang, Li "Map Building, Localization, and Structure Estimation Problems in Mobile Robotics" [thesis] Washington University in St. Louis, Department of Systems Science and Mathematics [retrieved on Jul. 14, 2021] (Year: 2000).*

"International Search Report (Form PCT/ISA/210)" of PCT/CN2020/095988, dated Jun. 30, 2019, pp. 1-5.

"Written Opinion of the International Searching Authority (Form PCT/ISA/237)" of PCT/CN2020/095988, dated Jun. 30, 2019, pp. 1-5.

* cited by examiner

METHOD FOR CONSTRUCTING CURVE OF ROBOT PROCESSING PATH OF PART WITH SMALL CURVATURE BASED ON POINT CLOUD BOUNDARY

CROSS-REFERENCE TO RELATED APPLICATION

This application is a 371 of international application of PCT application serial no. PCT/CN2020/095988, filed on Jun. 13, 2020, which claims the priority benefit of China application no. 201910581630.5, filed on Jun. 30, 2019. The entirety of each of the above mentioned patent applications is hereby incorporated by reference herein and made a part of this specification.

BACKGROUND

Technical Field

The disclosure relates to the field of robot vision detection, and more specifically relates to a curve discrete method based on geometric characteristics of a point cloud boundary.

Description of Related Art

The geometric characteristics of the point cloud boundary are an integral part of point cloud characteristics. The automatic segmentation, extraction, reconstruction, and discreteness of boundary curve characteristics are the prerequisites for automatic measurement, virtual assembly, and automatic processing of a thin-walled part with small curvature. At present, conventional point cloud boundary characteristic extraction is divided into two methods as follows.

The curved surface reconstruction method directly obtains a boundary characteristic line, and boundary characteristic points may be obtained after the boundary characteristic line is discretized. The particularity thereof is that target point cloud data is first segmented based on local characteristics of a curved surface. Then, quadratic or cubic parameters or algebraic curved surfaces are adopted to fit segmented local point cloud data. Finally, the boundary characteristic line is obtained through locally fitting the curved surface to find the intersection line. The core of curved surface reconstruction of target point cloud is the strategy of segmenting the point cloud and the corresponding algorithm. The main disadvantages of the method are that a characteristic vector of each point needs to be taken, the calculation amount is large, the algorithm efficiency is low, and a relatively long time is generally spent, which are difficult to satisfy the requirements of on-site production.

The method based on point cloud characteristic point extraction is opposite to the above method, that is, the boundary characteristic line is fitted after the boundary characteristic points are extracted. The main idea of the characteristic point extraction method is to estimate the curvature characteristics of sampling points through domain search and then identify the characteristic points of the boundary through the curvature characteristics. Since various geometric characteristics have their own suitable field types and field sizes, the method based on point cloud characteristic point extraction is more complicated when comparing algorithm designs, and the robustness is tested. However, the efficiency of the method is high.

The point cloud data boundary is limited by the precision of a scanner. The imaging principle and imaging quality are easily affected by the surface quality and reflective characteristics of a part. The formed point cloud boundary may easily be jagged. After non-uniform rational basis spline (NURBS) curve fitting and interpolation, a boundary curve may easily be wavy. Such characteristics also lead to inaccurate measurement based on point cloud data and poor consistency, and the extracted boundary curve cannot provide track reference for subsequent machining.

Currently, for an actual processing curve of a part to be processed, there are the following issues. 1) The collected point cloud data is not adopted as a guide to obtain the actual processing curve. 2) In the actual processing curve fitted when adopting the point cloud to guide the processing, the fitting error of the processing curve at rounded and sharp corners cannot be controlled, resulting in the sharp or rounded corner being cut. 3) Adopting a third-party software to plan the actual processing curve requires communication with the third-party software, so the cost is high and the procedure is complicated.

SUMMARY

In view of the defects or improvement requirements of the prior art, the disclosure provides a method for constructing an actual processing curve of a part with small curvature based on a point cloud boundary. Through multiple clustering of projection points, fitting of a straight line, a rounded corner, and a sharp corner within a plane etc., a processing curve within the plane is obtained, which is then mapped to a three-dimensional space to obtain the actual processing curve in the three-dimensional space. As such, the actual processing curve obtained from point cloud data of a part to be processed is implemented while keeping the sharp corner and the rounded corner of the part to be processed. The processing precision is high, the calculation is simple, no third-party software is necessary, and the cost is low.

In order to achieve the above objectives, according to the disclosure, a method for constructing an actual processing curve of a part with small curvature based on a point cloud boundary is provided. The method includes the following steps.

(a) A three-dimensional ordered boundary curve, comprising a plurality of ordered boundary points, of a part to be processed is encrypted, so that distribution of boundary points on the three-dimensional ordered boundary curve is denser to obtain an encrypted three-dimensional ordered boundary curve.

(b) All boundary points on the encrypted three-dimensional ordered boundary curve are fitted to form a plane, and each boundary point is projected into the plane, so as to obtain a projection point of each boundary point within the plane, and a projection vector corresponding to each projection point.

(c) Euclidean cluster is performed on the projection points within the plane, so that projection points that may be fitted into a straight line are clustered to obtain multiple straight line point sets. Each straight line point set is fitted into a straight line to obtain multiple straight lines.

(d) The Euclidean cluster is performed on projection points that are not fitted into the straight line to be divided into multiple corner point sets. Whether points in each corner point set may be fitted into a circular arc is determined. When the points may not be fitted into the circular arc, straight lines on left and right sides of the corner point set are respectively extended and then intersected to form a sharp corner. When the points may be fitted into the circular arc, the corner point set is fitted into the circular arc, and a radius and a center of the circular arc are obtained. A radius and a center of a circular arc are set with reference to the radius and the center obtained by fitting. According to the set radius and the set circle, points of the corner point set are constructed into the circular arc. The circular arc is tangent to the straight lines on the left and right sides of the corner point set.

So far, processing of all the projection points within the plane is completed, and a fitted boundary curve is obtained within the plane.

(e) Each projection point on the fitted boundary curve is back-projected to a curved surface where the three-dimensional ordered boundary curve is located according to a projection vector corresponding to each projection point, so as to obtain an actual processing boundary point corresponding to each projection point. Actual processing boundary points are sequentially connected to obtain an actual processing curve of the part to be processed.

Further preferably, in step (a), the encryption of the three-dimensional ordered boundary curve is preferably performed by adopting NURBS curve interpolation.

Further preferably, in step (c), the Euclidean cluster is preferably performed according to the following steps.

(c1) An external offset vector of each boundary point on the encrypted three-dimensional ordered boundary curve is calculated. The external offset vector is a unit vector of a normal vector and a tangent vector perpendicular to the boundary point at the same time.

(c2) An included angle between external offset vectors of adjacent boundary points is calculated. When the included angle is less than a preset threshold, two adjacent projection points in the plane corresponding to the adjacent boundary points are found. The two adjacent projection points are clustered into a same straight line point set. All boundary points are traversed to obtain multiple preliminary straight line point sets within the plane.

(c3) A distance between adjacent projection points in each of the preliminary straight line point sets is calculated. Whether the distance between the two adjacent projection points is greater than a preset distance value is determined. When the distance is greater than the preset distance value, the two adjacent projection points are separated to form two independent straight line point sets. When the distance is less than the preset distance value, the two adjacent projection points are grouped into a same straight line point set. All projection points in the preliminary straight line point set are traversed, so that the preliminary straight line point set is divided into one or more straight line point sets required finally to distinguish parallel straight lines in the same preliminary straight line point set.

Further preferably, in step (d), the performance of the Euclidean cluster on the projection points that are not fitted into the straight line is preferably performed according to a distance between two adjacent points. When the distance between the two is less than a preset acceptable threshold, the two adjacent points belong to a same corner point set. Otherwise, the two adjacent points do not belong to the same corner point set.

Further preferably, in step (d), the determination of whether the points in each corner point set may be fitted into the circular arc is preferably performed by adopting a random sample consensus fitting method based on a circular arc model.

Further preferably, in step (d), the setting of the radius and the center of the circular arc with reference to the radius and the center obtained by fitting is preferably performed in the following manner. For two straight lines on both sides of the corner point set, two parallel lines are respectively made above and below each straight line. A distance between each parallel line and the straight line is the set radius to obtain two parallel lines of each of the two straight lines, that is, four parallel lines. The four parallel lines intersect to obtain four intersection points. A plurality of distances between the four intersection points and the fitted center are calculated. One of the intersection points with the shortest distance is set as the set center.

Further preferably, in step (d), the straight lines on the left and right sides of the corner point set are obtained through the following manner. Points on the three-dimensional ordered boundary curve are ordered boundary points. Each ordered boundary point is projected to the plane and then forms an ordered projection point. The straight lines on the left and right sides of the corner point set may be obtained according to an order of projection points in the corner point set.

Further preferably, in step (a), the three-dimensional ordered boundary curve is obtained through collecting point cloud data of the part to be processed.

In general, compared with the prior art, the above technical solutions conceived by the disclosure can achieve the following beneficial effects.

1. The disclosure mainly adopts the algorithm design idea of identifying and extracting the characteristic points of the boundary curve, which ensures the efficiency of algorithm processing, and implements the possibility of application to actual engineering production even for large-scale point cloud processing.

2. The disclosure is based on an industrial thin-walled part, in the design, a boundary is generally based on conventional geometric characteristics, that is, a projection direction in a spatial main plane is based on the combination of a circular arc segment and a straight line segment, the extracted characteristics are reconstructed by adopting standard geometric characteristics to ensure the precision of measurement data and the consistency of processing results.

3. When Euclidean cluster is performed in step (c) of the disclosure, the clustering is actually performed twice, one time using the included angle of the external offset vectors as the clustering criterion, and the other time using the distance between the two points as the clustering criterion. The first clustering is to gather the points of all straight lines, and the second clustering is to distinguish the parallel straight lines. Since the included angle of the external offset vectors of the parallel straight lines is also less than the set threshold, it is not possible to separate all the straight lines through clustering once. Such manner is more precise and more accurate.

4. The original data processed by the disclosure is the point cloud data of the part to be processed, which is mainly used to guide the subsequent machining of the thin-walled part with small curvature. For point cloud data of a part with large curvature, points may easily overlap during projection. Therefore, the method is not applicable. The method provided by the disclosure may ensure shape characteristics and size parameters, and satisfy the quality of surface processing at the engineering site.

BRIEF DESCRIPTION OF THE DRAWINGS

FIG. 4(*b*) is a schematic diagram of a rounded corner constructed from the corner point set according to a preferred embodiment of the disclosure.

FIG. 4(*c*) is a comparison diagram of the corner point set and the rounded corner according to a preferred embodiment of the disclosure.

FIG. 5(*b*) is an enlarged view of a corner on the three-dimensional ordered boundary curve according to a preferred embodiment of the disclosure.

FIG. 5(*c*) is an enlarged view of a rounded corner on an actual processing curve according to a preferred embodiment of the disclosure.

FIG. 5(*d*) is the actual processing curve according to a preferred embodiment of the disclosure.

DETAILED DESCRIPTION OF DISCLOSED EMBODIMENTS

For the objectives, technical solutions, and advantages of the disclosure to be clearer, the disclosure is further described in detail below with reference to the accompanying drawings and the embodiments. It should be understood that the specific embodiments described here are only used to explain the disclosure, but not to limit the disclosure. In addition, the technical features involved in the various embodiments of the disclosure described below may be combined with each other as long as there is no conflict therebetween.

Figure 1:
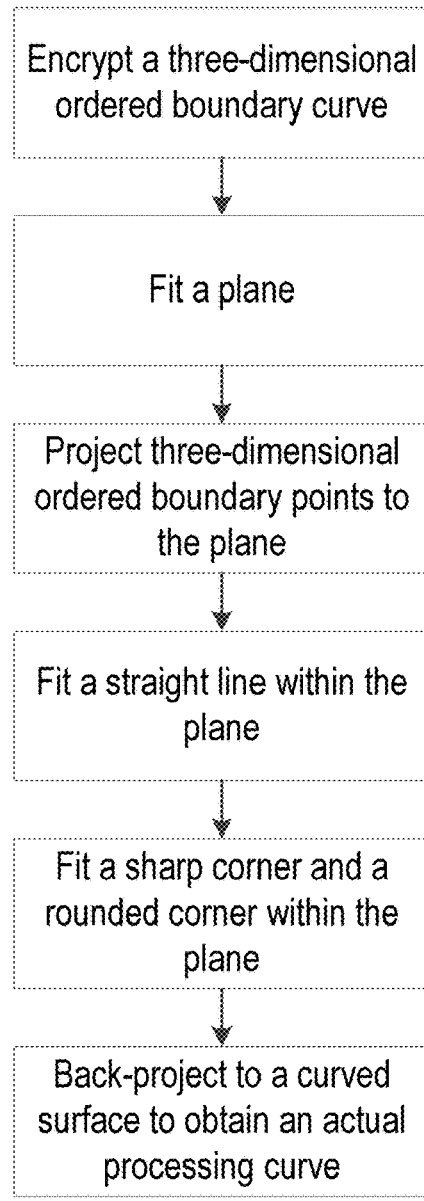
FIG. 1 is a flowchart of a method for constructing an actual processing curve of a part with small curvature based on a point cloud boundary according to a preferred embodiment of the disclosure.

As shown in FIG. 1, a method for constructing an actual processing curve of a part with small curvature based on a point cloud boundary includes the following steps.

(a) A three-dimensional ordered boundary curve, comprising a plurality of ordered boundary points, of a part to be processed is encrypted, so that distribution of boundary points on the three-dimensional ordered boundary curve is denser to obtain an encrypted three-dimensional ordered boundary curve.

Figure 2:
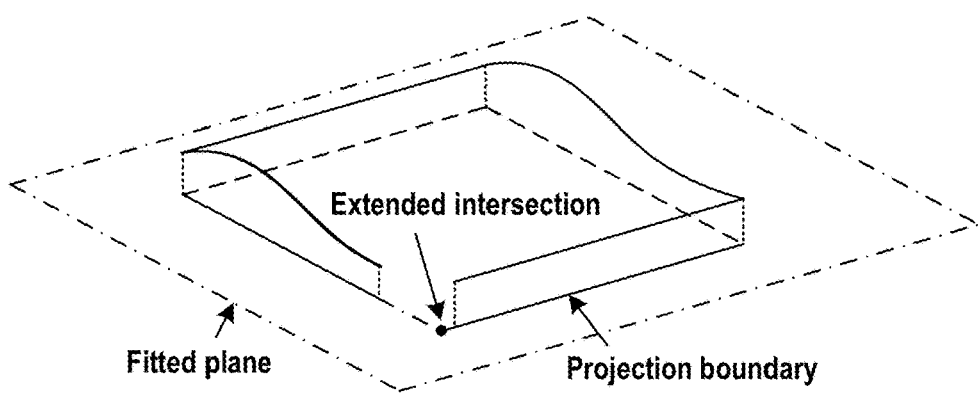
FIG. 2 is a schematic diagram of a three-dimensional ordered boundary curve projected to a plane according to a preferred embodiment of the disclosure.

(b) As shown in FIG. 2, all boundary points on the encrypted three-dimensional ordered boundary curve are fitted to form a plane, and each boundary point is projected into the plane, so as to obtain a projection point of each boundary point within the plane, and a projection vector corresponding to each projection point.

Figure 3:
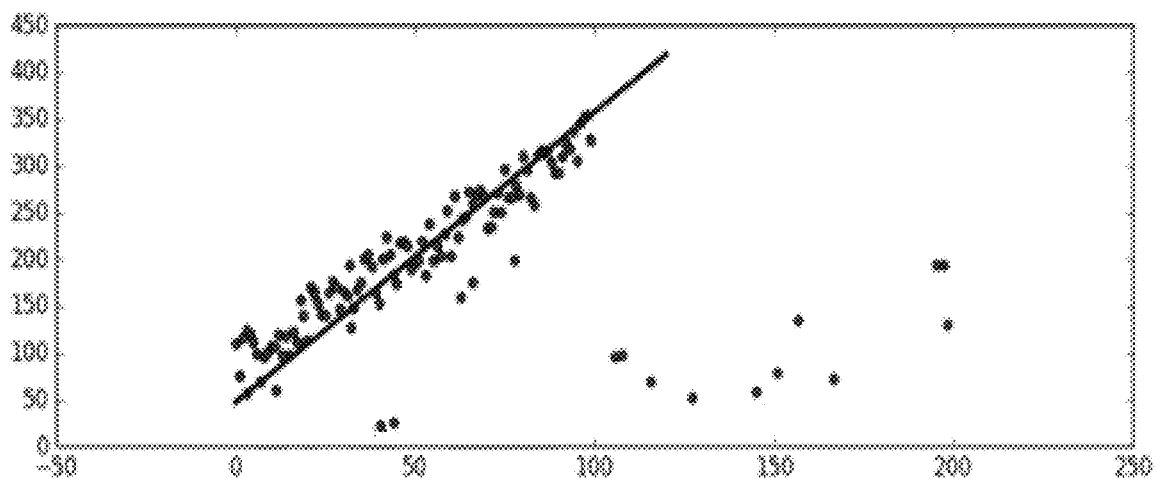
FIG. 3 is a schematic diagram for straight line fitting according to a preferred embodiment of the disclosure.
Figure 4A:
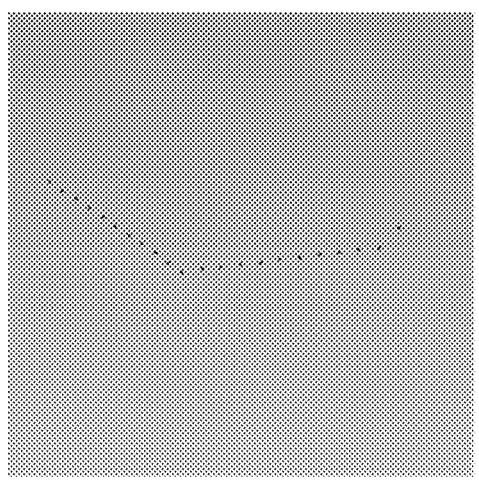
FIG. 4(*a*) shows a corner point set according to a preferred embodiment of the disclosure.
Figure 4B:
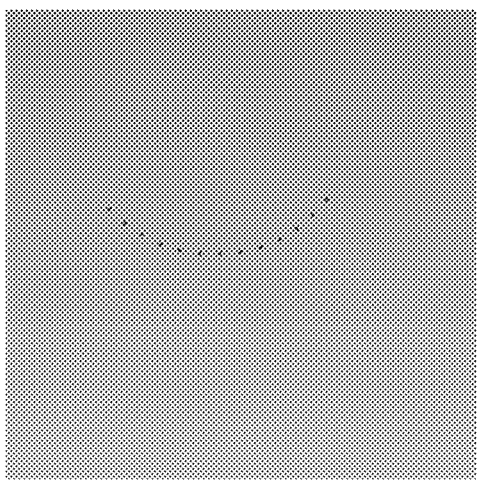
Figure 4C:
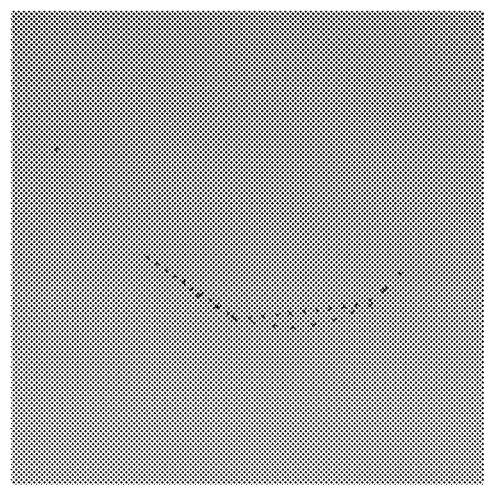

(c) As shown in FIG. 3, Euclidean cluster is performed on the projection points within the plane, so that projection points that may be fitted into a straight line are clustered to obtain multiple straight line point sets. Each straight line point set is fitted into a straight line to obtain multiple straight lines.

(d) The Euclidean cluster is performed on projection points that are not fitted into the straight line to be divided into multiple corner point sets. Whether points in each corner point set may be fitted into a circular arc is determined. When the points may not be fitted into the circular arc, straight lines on left and right sides of the corner point set are respectively extended and then intersected to form a sharp corner. When the points may be fitted into the circular arc, the corner point set is fitted into the circular arc, and a radius and a center of the circular arc are obtained. A radius and a center of a circular arc are set with reference to the radius and the center obtained by fitting. According to the set radius and the set circle, points of the corner point set are constructed into the circular arc. The circular arc is tangent to the straight lines on the left and right sides of the corner point set.

So far, processing of all the projection points within the plane is completed, and a fitted boundary curve is obtained within the plane.

(e) Each projection point on the fitted boundary curve is back-projected to a curved surface where the three-dimensional ordered boundary curve is located according to a projection vector corresponding to each projection point, so as to obtain an actual processing boundary point corresponding to each projection point. Actual processing boundary points are sequentially connected to obtain an actual processing curve of the part to be processed.

The three-dimensional ordered boundary curve in step (a) includes multiple ordered boundary points. In other words, each boundary point is ordered, for example, each boundary point may be sorted by number. Therefore, when each boundary point is projected to the plane, each projection point is also ordered. The actual processing boundary points are also ordered. In addition, characteristics of the three-dimensional ordered boundary curve of the part to be processed include a straight line part, and one type or two types of a sharp corner part and a rounded corner part. Therefore, obtained projection curve and actual processing curve also include a straight part, and one type or two types of the sharp corner part and the rounded corner part.

Further, in step (a), the encryption of the three-dimensional ordered boundary curve is preferably performed by adopting NURBS curve interpolation. Specifically, an ordered point set with NURBS space curve characteristics is obtained according to NURBS curve fitting and interpolation of a specified number of points and a specified discrete multiple.

Further, in Step (c), the Euclidean cluster is preferably performed according to the following steps.

(c1) An external offset vector of each boundary point on the encrypted three-dimensional ordered boundary curve is calculated. The external offset vector is a unit vector of a normal vector and a tangent vector perpendicular to the boundary point at the same time.

(c2) An included angle between external offset vectors of adjacent boundary points is calculated. When the included angle is less than a preset threshold, two adjacent projection points in the plane corresponding to the adjacent boundary points are found. The two adjacent projection points are clustered into a same straight line point set. All boundary points are traversed to obtain multiple preliminary straight line point sets within the plane.

(c3) A distance between adjacent projection points in each of the preliminary straight line point sets is calculated. Whether the distance between the two adjacent projection points is greater than a preset distance value is determined. When the distance is greater than the preset distance value, the two adjacent projection points are separated to form two independent straight line point sets. When the distance is less than the preset distance value, the two adjacent projection points are grouped into a same straight line point set. All projection points in the preliminary straight line point set are traversed, so that the preliminary straight line point set is divided into one or more straight line point sets required finally to distinguish parallel straight lines in a same preliminary straight line point set.

Further, in step (d), the performance of the Euclidean cluster on the projection points that are not fitted into the straight line is preferably performed according to a distance between two adjacent points. When the distance between the two is less than a preset acceptable threshold, the two adjacent points belong to a same corner point set. Otherwise, the two adjacent points do not belong to the same corner point set.

Further, in step (d), the determination of whether the points in each corner point set may be fitted into the circular arc is preferably performed by adopting a random sample consensus fitting method based on a circular arc model.

Further, in step (d), the setting of the radius and the center of the circular arc with reference to the radius and the center obtained by fitting is preferably performed in the following manner. For two straight lines on both sides of the corner point set, two parallel lines are respectively made above and below each straight line. A distance between each parallel line and the straight line is the set radius to obtain two parallel lines of each of the two straight lines, that is, four parallel lines. The four parallel lines intersect to obtain four intersection points. A plurality of distances between the four intersection points and the fitted center are calculated. One of the intersection points with the shortest distance is set as the set center.

Further, in step (d), the straight lines on the left and right sides of the corner point set are obtained through the following manner. Points on the three-dimensional ordered boundary curve are ordered boundary points. Each ordered boundary point is projected to the plane and then forms an ordered projection point. The straight lines on the left and right sides of the corner point set may be obtained according to an order of projection points in the corner point set.

Further, in step (a), the three-dimensional ordered boundary curve is obtained through collecting point cloud data of the part to be processed.

Figure 5A:
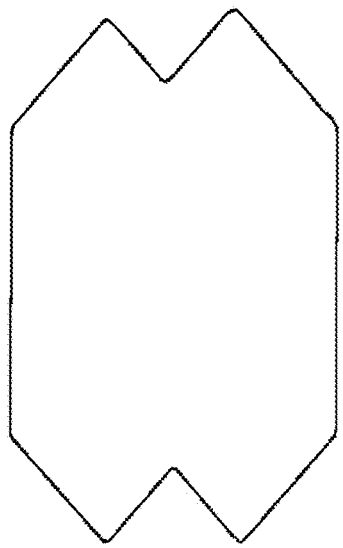
FIG. 5(*a*) is a three-dimensional ordered boundary curve according to a preferred embodiment of the disclosure.
Figure 5B:
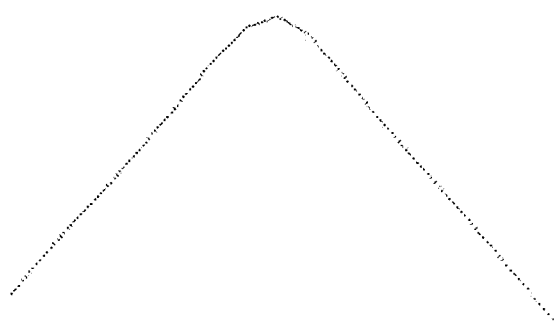
Figure 5C:
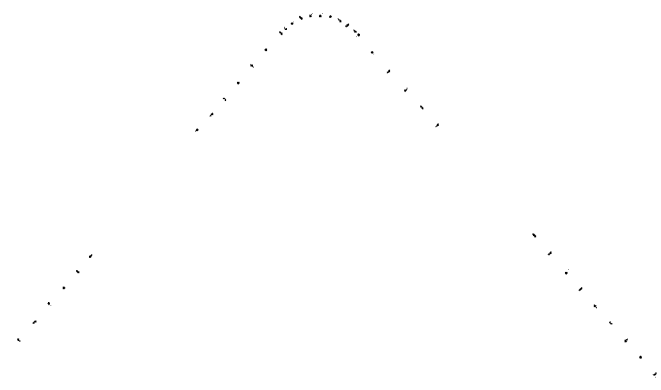
Figure 5D:
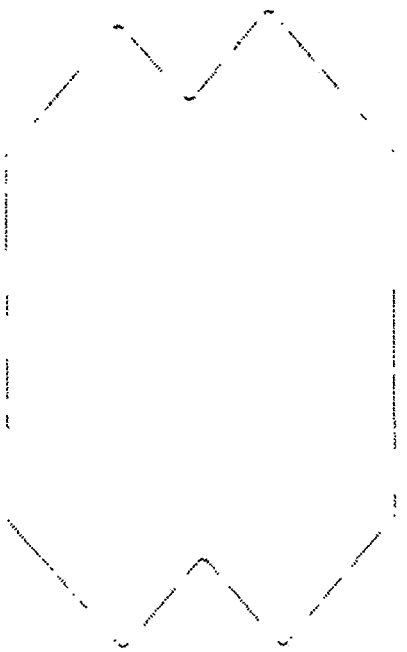

The disclosure adopts an area scanner to obtain high-density scattered point cloud. The number of point cloud collected in a single time may be up to 5 million. The disclosure adopts the point cloud for a thin-walled part with small curvature as an example. FIG. 5(a) shows a three-dimensional ordered boundary curve of a part to be processed in the embodiment. FIG. 5(b) is an enlarged view of original point cloud data of a corner segment of the three-dimensional ordered boundary curve. FIG. 5(c) shows a point set at a corner obtained after processing according to a method of the disclosure. It can be seen that the rounded corner at this time is smooth without any noise points. FIG. 5(d) shows a final actual processing curve obtained according to the method of the disclosure. Although there are some disconnected areas shown, the disconnected areas will be filled by a machine tool during actual processing. Also, the straight line segments, rounded corners, and sharp corners may be clearly seen from the drawing, so the finally obtained processing part has high precision.

Persons skilled in the art may easily understand that the above are only the preferred embodiments of the disclosure and are not intended to limit the disclosure. Any modification, equivalent replacement, improvement, etc. made within the spirit and principle of the disclosure should be included in the protection scope of the disclosure.

What is claimed is:

1. A method for constructing an actual processing curve of a part with small curvature based on a point cloud boundary, adapted for an electronic apparatus having a processor, characterized in that the method includes the following steps:

(a) encrypting a three-dimensional ordered boundary curve by the processor, comprising a plurality of ordered boundary points, of a part to be processed, so that distribution of boundary points on the three-dimensional ordered boundary curve is denser to obtain an encrypted three-dimensional ordered boundary curve by the processor;

(b) fitting all boundary points by the processor on the encrypted three-dimensional ordered boundary curve to form a plane, and projecting each of the boundary points into the plane by the processor, so as to obtain a projection point of each of the boundary points within the plane, and a projection vector corresponding to each of projection points;

(c) performing Euclidean cluster by the processor on the projection points within the plane, so that projection points that are fitted into a straight line are clustered to obtain a plurality of straight line point sets, and fitting each of the straight line point sets into the straight line to obtain a plurality of straight lines;

(d) performing the Euclidean cluster by the processor on projection points that are not fitted into the straight line to be divided into a plurality of corner point sets, and determining whether points in each of the corner point sets may be fitted into a circular arc by the processor, wherein when the points may not be fitted into the circular arc, straight lines on left and right sides of the corner point set are respectively extended and then intersected to form a sharp corner by the processor; and when the points may be fitted into the circular arc, fitting the corner point set into the circular arc by the processor to obtain a radius and a center of the circular arc, setting the radius and the center of a circular arc by the processor with reference to the radius and the center obtained by fitting, constructing points of the corner point set into the circular arc according to the set radius and the set circle, and the circular arc is tangent to the straight lines on the left and right sides of the corner point set;

completing processing of all the projection points within the plane so far by the processor, and obtaining a fitted boundary curve within the plane by the processor; and (e) back-projecting each of the projection points by the processor on the fitted boundary curve to a curved surface where the three-dimensional ordered boundary curve is located according to a projection vector corresponding to each of the projection points, so as to obtain an actual processing boundary point corresponding to each of the projection points, and sequentially connecting actual processing boundary points to obtain an actual processing curve of the part to be processed by the processor.

2. The method for constructing the actual processing curve of the part with small curvature based on the point cloud boundary according to claim 1, characterized in that in step (a), encrypting the three-dimensional ordered boundary curve by the processor is performed by adopting NURBS curve interpolation.

3. The method for constructing the actual processing curve of the part with small curvature based on the point cloud boundary according to claim 1, characterized in that in step (c), performing the Euclidean cluster by the processor on the projection points within the plane is preferably according to following steps:

(c1) calculating an external offset vector of each of the boundary points by the processor on the encrypted three-dimensional ordered boundary curve, wherein the external offset vector is a unit vector of a normal vector and a tangent vector perpendicular to the boundary point at a same time;

(c2) calculating an included angle between external offset vectors of adjacent boundary points by the processor, wherein when the included angle is less than a preset threshold, two adjacent projection points in the plane corresponding to the adjacent boundary points are found by the processor, the two adjacent projection points are clustered into a same straight line point set by the processor, all boundary points are traversed to obtain a plurality of preliminary straight line point sets within the plane by the processor; and (c3) calculating a distance between adjacent projection points in each of the preliminary straight line point sets by the processor, and determining whether the distance between the two adjacent projection points is greater than a preset distance value by the processor, wherein when the distance is greater than the preset distance value, the two adjacent projection points are separated to form two independent straight line point sets by the processor, and when the distance is less than the preset distance value, the two adjacent projection points are grouped into a same straight line point set by the processor, all projection points in the preliminary straight line point set are traversed by the processor, so that the preliminary straight line point set is divided into one or more straight line point sets required finally to distinguish parallel straight lines in the same preliminary straight line point set by the processor.

4. The method for constructing the actual processing curve of the part with small curvature based on the point cloud boundary according to claim 1, characterized in that in step (d), performing the Euclidean cluster by the processor on the projection points that are not fitted into the straight line is performed according to a distance between two adjacent points, wherein when the distance between the two adjacent points is less than a preset acceptable threshold, the two adjacent points belong to a same corner point set, or otherwise, the two adjacent points do not belong to the same corner point set.

5. The method for constructing the actual processing curve of the part with small curvature based on the point cloud boundary according to claim 1, characterized in that in step (d), determining whether the points in each of the corner point sets may be fitted into the circular arc by the processor is performed by adopting a random sample consensus fitting method based on a circular arc model.

6. The method for constructing the actual processing curve of the part with small curvature based on the point cloud boundary according to claim 1, characterized in that in step (d), setting the radius and the center of the circular arc by the processor with reference to the radius and the center obtained by fitting is preferably performed in a following manner: for two straight lines on both sides of the corner point set, two parallel lines are respectively made above and below each of the straight lines, a distance between each of the parallel lines and the straight line is the set radius to obtain two parallel lines of each of the two straight lines, that is, four parallel lines, the four parallel lines intersect to obtain four intersection points, a plurality of distances between the four intersection points and the fitted center are calculated, and one of the intersection points with a shortest distance is set as the set center.

7. The method for constructing the actual processing curve of the part with small curvature based on the point cloud boundary according to claim 1, characterized in that in step (d), the straight lines on the left and right sides of the corner point set are obtained through a following manner: points on the three-dimensional ordered boundary curve are ordered boundary points, each of the ordered boundary points is projected to the plane and then forms an ordered projection point, and obtaining the straight lines on the left and right sides of the corner point set by the processor according to an order of projection points in the corner point set.

8. The method for constructing the actual processing curve of the part with small curvature based on the point cloud boundary according to claim 1, characterized in that in step (a), the three-dimensional ordered boundary curve is obtained through collecting point cloud data of a part by the processor to be processed.

9. The method for constructing the actual processing curve of the part with small curvature based on the point cloud boundary according to claim 2, characterized in that in step (c), performing the Euclidean cluster by the processor on the projection points within the plane is preferably according to following steps:

(c1) calculating an external offset vector of each of the boundary points by the processor on the encrypted three-dimensional ordered boundary curve, wherein the external offset vector is a unit vector of a normal vector and a tangent vector perpendicular to the boundary point at a same time;

(c2) calculating an included angle between external offset vectors of adjacent boundary points by the processor, wherein when the included angle is less than a preset threshold, two adjacent projection points in the plane corresponding to the adjacent boundary points are found by the processor, the two adjacent projection points are clustered into a same straight line point set by the processor, all boundary points are traversed to obtain a plurality of preliminary straight line point sets within the plane by the processor; and (c3) calculating a distance between adjacent projection points in each of the preliminary straight line point sets by the processor, and determining whether the distance between the two adjacent projection points is greater than a preset distance value by the processor, wherein when the distance is greater than the preset distance value, the two adjacent projection points are separated to form two independent straight line point sets by the processor, and when the distance is less than the preset distance value, the two adjacent projection points are grouped into a same straight line point set by the processor, all projection points in the preliminary straight line point set are traversed by the processor, so that the preliminary straight line point set is divided into one or more straight line point sets required finally to distinguish parallel straight lines in the same preliminary straight line point set by the processor.

10. The method for constructing the actual processing curve of the part with small curvature based on the point cloud boundary according to claim 2, characterized in that in step (a), the three-dimensional ordered boundary curve is obtained through collecting point cloud data of a part to be processed by the processor.

11. The method for constructing the actual processing curve of the part with small curvature based on the point cloud boundary according to claim 3, characterized in that in step (a), the three-dimensional ordered boundary curve is obtained through collecting point cloud data of a part to be processed by the processor.

12. The method for constructing the actual processing curve of the part with small curvature based on the point cloud boundary according to claim 4, characterized in that in step (a), the three-dimensional ordered boundary curve is obtained through collecting point cloud data of a part to be processed by the processor.

13. The method for constructing the actual processing curve of the part with small curvature based on the point cloud boundary according to claim 5, characterized in that in step (a), the three-dimensional ordered boundary curve is obtained through collecting point cloud data of a part to be processed by the processor.

14. The method for constructing the actual processing curve of the part with small curvature based on the point cloud boundary according to claim 6, characterized in that in step (a), the three-dimensional ordered boundary curve is obtained through collecting point cloud data of a part to be processed by the processor.

15. The method for constructing the actual processing curve of the part with small curvature based on the point cloud boundary according to claim 7, characterized in that in step (a), the three-dimensional ordered boundary curve is obtained through collecting point cloud data of a part to be processed by the processor.

16. The method for constructing the actual processing curve of the part with small curvature based on the point cloud boundary according to claim 9, characterized in that in step (a), the three-dimensional ordered boundary curve is obtained through collecting point cloud data of a part to be processed by the processor.

* * * * *